United States Patent
Kawasaki et al.

(10) Patent No.: US 10,937,450 B1
(45) Date of Patent: Mar. 2, 2021

(54) MAGNETIC FLUX GUIDING DEVICE WITH SPIN TORQUE OSCILLATOR (STO) FILM HAVING ONE OR MORE NEGATIVE SPIN POLARIZATION LAYERS IN ASSISTED WRITING APPLICATION

(71) Applicant: Headway Technologies, Inc., Milpitas, CA (US)

(72) Inventors: Shohei Kawasaki, Sunnyvale, CA (US); Wenyu Chen, San Jose, CA (US); Tetsuya Roppongi, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/927,205

(22) Filed: Jul. 13, 2020

(51) Int. Cl.
    *G11B 5/127* (2006.01)
    *G11B 5/02* (2006.01)
    *G11B 5/31* (2006.01)

(52) U.S. Cl.
    CPC .............. *G11B 5/1278* (2013.01); *G11B 5/02* (2013.01); *G11B 5/314* (2013.01); *G11B 5/315* (2013.01)

(58) Field of Classification Search
    CPC ......... G11B 5/1278; G11B 5/02; G11B 5/314; G11B 5/315
    USPC .......................................... 360/125.3–125.35
    See application file for complete search history.

(56) References Cited

U.S. PATENT DOCUMENTS

| | | |
|---|---|---|
| 1,032,469 A | 7/1912 | Demery |
| 6,785,092 B2 | 8/2004 | Covington et al. |
| 6,809,899 B1 | 10/2004 | Chen et al. |
| 6,954,340 B2 | 10/2005 | Shukh et al. |
| 7,009,812 B2 | 3/2006 | Hsu et al. |
| 7,589,600 B2 | 9/2009 | Dimitrov et al. |
| 7,724,469 B2 | 5/2010 | Gao et al. |

(Continued)

FOREIGN PATENT DOCUMENTS

| | | |
|---|---|---|
| JP | 2002133610 | 5/2002 |
| JP | 2002298309 | 10/2002 |

(Continued)

OTHER PUBLICATIONS

U.S. Office Action, U.S. Appl. No. 16/781,631, Applicant: Wu et al., dated Jun. 25, 2020, 14 pages.

(Continued)

*Primary Examiner* — Allen T Cao
(74) *Attorney, Agent, or Firm* — Saile Ackerman LLC; Stephen B. Ackerman

(57) ABSTRACT

A spin transfer torque reversal assisted magnetic recording (STRAMR) device is disclosed wherein a flux guiding layer (FGL) magnetization flips to an opposite direction opposing the write gap (WG) field because of spin torque from an adjacent spin polarization (SP) layer and spin injection layer (SIL) when a current (Ia) of sufficient density is applied across the device and between the main pole (MP) and trailing shield (TS) thereby enhancing the MP write field. The SP layer adjoins the MP or TS and maintains a magnetization in the WG field direction. One or both of the SIL and FGL has a spin polarization from −0.4 to 0.3 and may be doped with C, N, or B so that the extent of FGL flipping is greater at a given current density than in the prior art where all magnetic layers within the STRAMR device have a positive spin polarization ≥0.4.

27 Claims, 15 Drawing Sheets

(56) References Cited

U.S. PATENT DOCUMENTS

| | | | |
|---|---|---|---|
| 7,835,111 B2 | 11/2010 | Flint et al. | |
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,634,163 B2 | 1/2014 | Tanabe et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 9,142,228 B2 | 9/2015 | Fujita et al. | |
| 9,230,571 B1 | 1/2016 | Chen et al. | |
| 9,275,672 B2 | 3/2016 | Shiroishi et al. | |
| 9,299,367 B1 | 3/2016 | Tang et al. | |
| 9,305,574 B1 | 4/2016 | Nagasaka et al. | |
| 9,361,912 B1 | 6/2016 | Liu et al. | |
| 9,406,317 B1 | 8/2016 | Tang et al. | |
| 9,466,319 B1 | 10/2016 | Tang et al. | |
| 9,805,746 B1 | 10/2017 | Okamura | |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 9,978,404 B2 | 5/2018 | Taguchi et al. | |
| 10,037,772 B2 | 7/2018 | Okamura et al. | |
| 10,121,497 B1 | 11/2018 | Takahashi et al. | |
| 10,210,888 B1 | 2/2019 | Li | |
| 10,354,708 B2 | 7/2019 | Ohmori et al. | |
| 10,366,714 B1 | 7/2019 | Olson | |
| 10,424,326 B1 | 9/2019 | Chen et al. | |
| 10,490,216 B1 | 11/2019 | Chen et al. | |
| 10,522,174 B1 | 12/2019 | Chen | |
| 10,546,600 B1 | 1/2020 | Koizumi | |
| 10,559,318 B1 | 2/2020 | Chen | |
| 10,580,441 B1 | 3/2020 | Chen | |
| 10,839,831 B1* | 11/2020 | Nguyen | G11B 5/23 |
| 2002/0034043 A1 | 3/2002 | Okada et al. | |
| 2004/0150910 A1 | 8/2004 | Okada | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Plan et al. | |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0211271 A1 | 9/2011 | Ng et al. | |
| 2011/0216447 A1* | 9/2011 | Li | G11B 5/1278 360/313 |
| 2012/0292723 A1 | 11/2012 | Luo et al. | |
| 2013/0062308 A1 | 3/2013 | Funayama et al. | |
| 2014/0071562 A1 | 3/2014 | Chen et al. | |
| 2014/0177092 A1 | 6/2014 | Katada et al. | |
| 2014/0313616 A1 | 10/2014 | Kusukawa | |
| 2015/0043106 A1 | 2/2015 | Yamada | |
| 2015/0098150 A1 | 4/2015 | Chiu | |
| 2016/0035375 A1 | 2/2016 | Gao | |
| 2016/0218728 A1 | 7/2016 | Zhu | |
| 2017/0133044 A1 | 5/2017 | Lim et al. | |
| 2017/0309301 A1* | 10/2017 | Takahashi | G11B 5/3133 |
| 2018/0075868 A1 | 3/2018 | Koui et al. | |
| 2019/0244635 A1 | 8/2019 | Goncharov | |
| 2019/0279666 A1 | 9/2019 | Freitag | |
| 2019/0325902 A1 | 10/2019 | De Albuquerque et al. | |
| 2020/0013429 A1 | 1/2020 | Freitag et al. | |
| 2020/0176022 A1 | 6/2020 | Li | |

FOREIGN PATENT DOCUMENTS

| | | |
|---|---|---|
| JP | 2008021398 | 1/2008 |
| JP | 2010157303 | 7/2010 |

OTHER PUBLICATIONS

U.S. Office Action, U.S. Appl. No. 16/781,618, Applicant: Wu, Yan, dated Jul. 7, 2020, 14 pages.

PTO Office Action, U.S. Appl. No. 12/964,202, Applicant: Sasaki et al, Notification date: Nov. 28, 2012, 11 pages.

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation, 4 pages.

Nov. 13, 2012, Office Action issued in Japanese Patent Application No. 2011-149243, with English language translation, 6 pages.

Nov. 13, 2012, Office Action issued in Japanese Patent Application No. 2011-149244, with English language translation, 6 pages.

"Spin-Torque Oscillator Based on Magnetic Tunnel Junction with a Perpendicularly Magnetized Free Layer and In-Plane Magnetized Polarizer," by Hitoshi Kubota, et al., 2013 the Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

Co-pending U.S. Pat. No. HT18-030, U.S. Appl. No. 16/546,387, filed Aug. 21, 2019, "Spin Transfer Torque Oscillator (STO) With Spin Torque Injection to a Flux Generating Layer (FGL) From Two Sides," by Yan Wu, 44 pages.

* cited by examiner

MAGNETIC FLUX GUIDING DEVICE WITH SPIN TORQUE OSCILLATOR (STO) FILM HAVING ONE OR MORE NEGATIVE SPIN POLARIZATION LAYERS IN ASSISTED WRITING APPLICATION

RELATED PATENT APPLICATIONS

This application is related to the following: U.S. Pat. Nos. 10,424,326; 10,490,216; and Ser. No. 16/546,387, filed on Aug. 21, 2019; assigned to a common assignee, and herein incorporated by reference in their entirety.

TECHNICAL FIELD

The present disclosure relates to a design for a spin torque (STO) device in a write gap (WG) between a main pole (MP) and trailing shield (TS) that enables spin transfer torque reversal assisted magnetic recording (STRAMR) wherein a flux guiding layer (FGL) magnetization flips to an opposite direction that opposes the WG magnetic field as a result of spin torque from an adjacent spin polarization (SP) layer and from an adjacent spin injection layer (SIL) when a current (Ia) of sufficient density is applied across the STO device thereby enhancing the MP write field, and wherein one or both of the SIL and FGL are a material with a spin polarization from −0.4 to 0.3 so that the extent of FGL flipping is greater at a given current density than in the prior art.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower main pole field.

Spin transfer torque devices (also known as STO) are based on a spin-transfer effect that arises from the spin dependent electron transport properties of ferromagnetic (FM)-spacer-FM multilayers. When a spin-polarized current passes through a magnetic multilayer in a CPP (current perpendicular to plane) configuration, the spin angular moment of electrons from a first FM layer (FM1) that are incident on a second FM layer (FM2) interacts with magnetic moments of FM2 near the interface between the FM2 and non-magnetic spacer. Through this interaction, the electrons transfer a portion of their angular momentum to FM2. As a result, spin-polarized current can switch the FM2 magnetization direction if the current density is sufficiently high. STO devices are also referred to as spintronic devices and have FM layers that may have a perpendicular magnetic anisotropy (PMA) component where magnetization is aligned substantially perpendicular to the plane of FM1 and FM2. However, unlike Magnetoresistive Random Access Memory (MRAM) where PMA is necessary to keep magnetization perpendicular to plane in a free layer and reference layer, for example, STO devices in MAMR and related applications have a sufficiently strong WG field to align magnetization in FM layers without requiring inherent PMA in the FM layers.

MAMR typically operates with the application of a bias current across the STO device and between the TS and MP in order to apply spin torque on an oscillation layer (OL) so that the OL's oscillation generates a high frequency RF field. The RF field induces a precessional state and lower coercivity in a magnetic bit to be written in a magnetic medium. Simultaneously, a MP write field is applied from an air bearing surface (ABS) to the magnetic medium, and lower field strength is needed to write the bit because of the RF field assist. In spin-torque-assisted FGL reversal schemes, FGL magnetization flips to an opposite direction when the applied current across the STRAMR device is sufficiently large thereby increasing the WG reluctance, which causes a greater MP write field output. Both MAMR and STRAMR typically require a relatively high current density ($>10^8$ A/cm$^2$) in order to apply a useful spin torque effect for generating a RF field or for FGL flipping. Since the required applied current for optimum FGL flipping is near the maximum value that can be tolerated to ensure good device reliability, there is a need to design an improved STRAMR scheme that operates efficiently with a considerable reduction in applied current density. Alternatively, a design is desirable that enables a greater write field enhancement as a result of a greater degree of FGL magnetization flipping at a given current density.

SUMMARY

One objective of the present disclosure is to provide a STO device operating in a STRAMR scheme that enables a larger spin-torque-induced reversal effect on a FGL magnetization at a given bias current density, or alternatively, for a desired amount of FGL flipping, the required bias current density may be reduced for improved STO device reliability.

A second objective of the present disclosure is to provide a STO device according to the first objective that provides a reduced bit error rate (BER).

A third objective of the present disclosure is to provide a STO device according to the first two objectives that does not require a significant amount of extra STO layers or process steps to fabricate.

According to the embodiments of the present invention, these objectives are achieved with a STO device operating in a STRAMR scheme but also capable of a MAMR assist wherein a flux guiding layer (FGL) is formed between a MP and a TS, and within a WG. Leads from the main pole and trailing shield are connected to a direct current (DC) source that provides an applied bias current (Ia) across the STO device during an assisted writing process.

According to the first three embodiments, the STO device has a stack of layers with a spin sink (pxL), spin injection layer (SIL), first non-magnetic spacer (ppL1), FGL, second non-magnetic spacer (ppL2), and a spin polarization (SP) layer sequentially formed on a main pole (MP) tapered trailing side at the ABS. The SP layer contacts a TS bottom surface and is ferromagnetically coupled to the TS. In the absence of an applied current across the STO device, each of the SIL, FGL, and SP layer has a magnetization substantially aligned in the WG magnetic field ($H_{WG}$) direction. Each of ppL1 and ppL2 is a spin polarization preserving layer in which electrons in Ia will largely retain their spin polarization when traversing ppL1 and ppL2. On the other hand, the pxL is a non-spin polarization preserving layer so that spin polarized electrons transiting the pxL will have their spin polarization randomized by spin flipping scattering. Moreover, the pxL is sufficiently thick so that the MP and SIL are not magnetically coupled. A key feature is that one or both of the SIL and FGL is a material with a spin polarization that is negative or weakly positive, and in the range of −0.4 to 0.3.

According to a first embodiment, the FGL and SP layer are positive spin polarization materials while the SIL is a negative (or weakly positive) spin polarization material (nSIL) with a low saturation magnetization×thickness (Mst) value that is substantially less than that of the FGL. When an Ia of sufficient magnitude (density) is applied from the TS to the MP across the STO device during a write process, FGL magnetization flips to an opposite direction (opposite to the WG magnetic field) as a result of additive spin torque from the nSIL and SP layer thereby enhancing the write field on the magnetic medium compared with a prior art example where all of the SIL, FGL, and SP layer are materials with a spin polarization ≥0.4, and spin torque from the SIL opposes (substantially cancels) spin torque on the FGL that is applied from the SP layer. During an intermediate current density less than that required for FGL flipping, the nSIL magnetization flips to a direction substantially opposite to the WG magnetic field, but flips back to a direction substantially parallel to the WG magnetic field at the current density needed to flip FGL magnetization. It should be understood that all three magnetic layers enter a precessional state wherein an oscillation generates a RF field on one or more magnetic bits in the magnetic medium to provide a MAMR effect during the write process. However, the MAMR contribution from the FGL diminishes as Ia density increases and FGL magnetization becomes more aligned opposite to the WG field to provide a STRAMR assist to the write field.

In a second embodiment, only the FGL is a negative (or weakly positive) spin polarization material (nFGL) in the STO device. A third embodiment has both of an nSIL and an nFGL in the STO device. The second and third embodiments are further improvements over the first embodiment since a lower applied current density is required for a given extent of FGL flipping (and MP write field enhancement). Alternatively, a greater degree of FGL flipping occurs compared with the first embodiment when the same Ia current density is applied across the STO device.

In the fourth through sixth embodiments, the features and benefits of the first through third embodiments are retained except the positions of the layers in the STO device are reversed. As a result, the STO device has a SP layer/ppL2/FGL/ppL1/SIL/pxL configuration where the SP layer contacts (and is FM coupled) to the MP, the pxL is the uppermost layer and adjoins the TS bottom surface, and at least one of the FGL and SIL is a nFGL or nSIL material, respectively. At a certain current density (where current Ia flows from the MP to TS), additive spin torque from the SP layer and SIL (or nSIL) causes FGL (or nFGL) magnetization to flip, and enhance the MP write field. Improved writability and better bit error rate (BER) are realized over prior art STO devices wherein all magnetic layers are comprised of a material with a spin polarization ≥0.4 such as Fe, Co, Ni, and alloys or multilayers thereof.

The present disclosure also encompasses a process flow for forming a STO device between a MP and TS according to an embodiment described herein.

DETAILED DESCRIPTION

Figure 1:
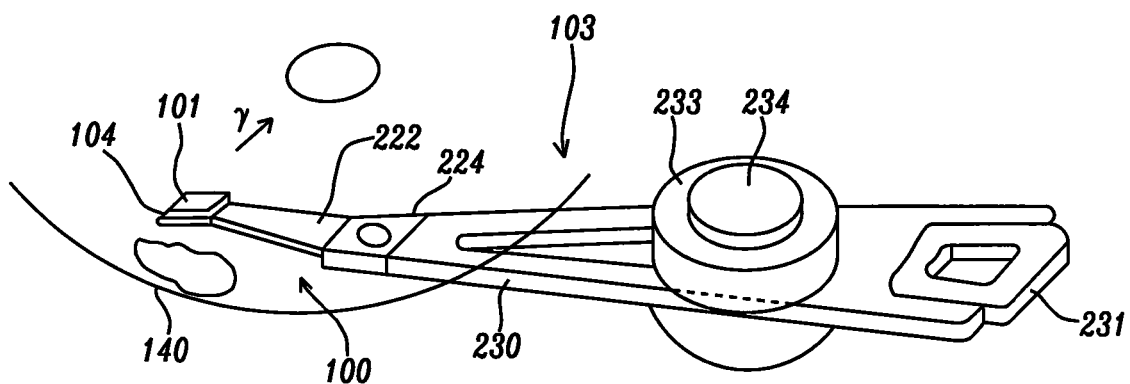
FIG. 1 is a perspective view of a head arm assembly of the present disclosure.

The present disclosure is a writer structure wherein a STO device that enables both of a STRAMR effect for FGL flipping, and a MAMR assist for writing on adjacent magnetic bits in a magnetic medium, is formed between a main pole and a trailing shield. In the drawings, the y-axis is in a cross-track direction, the z-axis is in a down-track direction, and the x-axis is in a direction orthogonal to the ABS and towards a back end of the writer structure. Thickness refers to a substantially down-track distance. It should be understood that thickness is the direction perpendicular to the film plane, typically 0-30 degrees from the z-axis direction to create a MP surface slope in most of current writers. Width is a cross-track distance, and height is a distance from the ABS in the x-axis direction. In some of the drawings, a magnetic bit is considerably enlarged over actual size in order to more easily depict a magnetization therein. The term "higher degree of flipping" means that FGL magnetization is flipped closer to a direction that is anti-parallel to the WG magnetic field. A "weak" positive spin polarization is defined as a spin polarization that is from 0 up to 0.3 while a negative spin polarization according to the present disclosure is typically from −0.4 to 0.

Referring to FIG. 1, a head gimbal assembly (HGA) 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
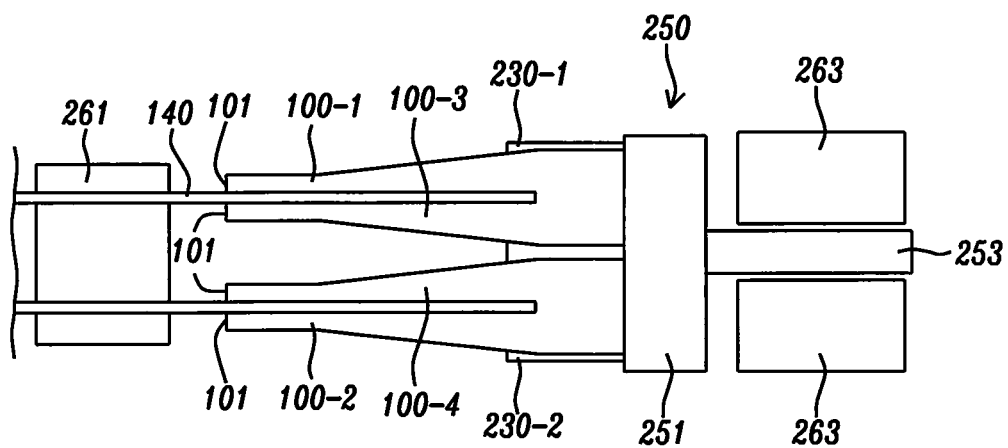
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
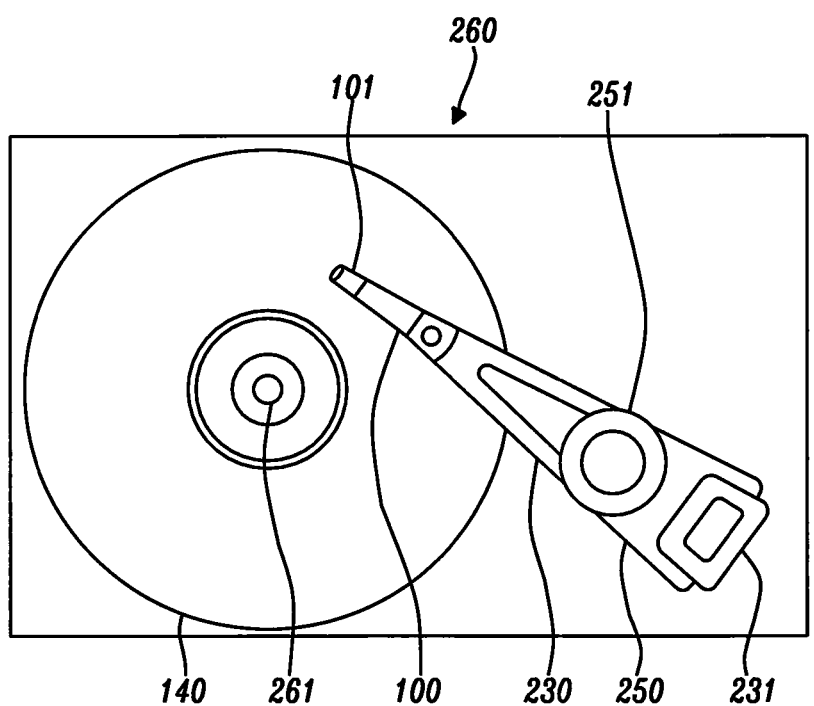
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
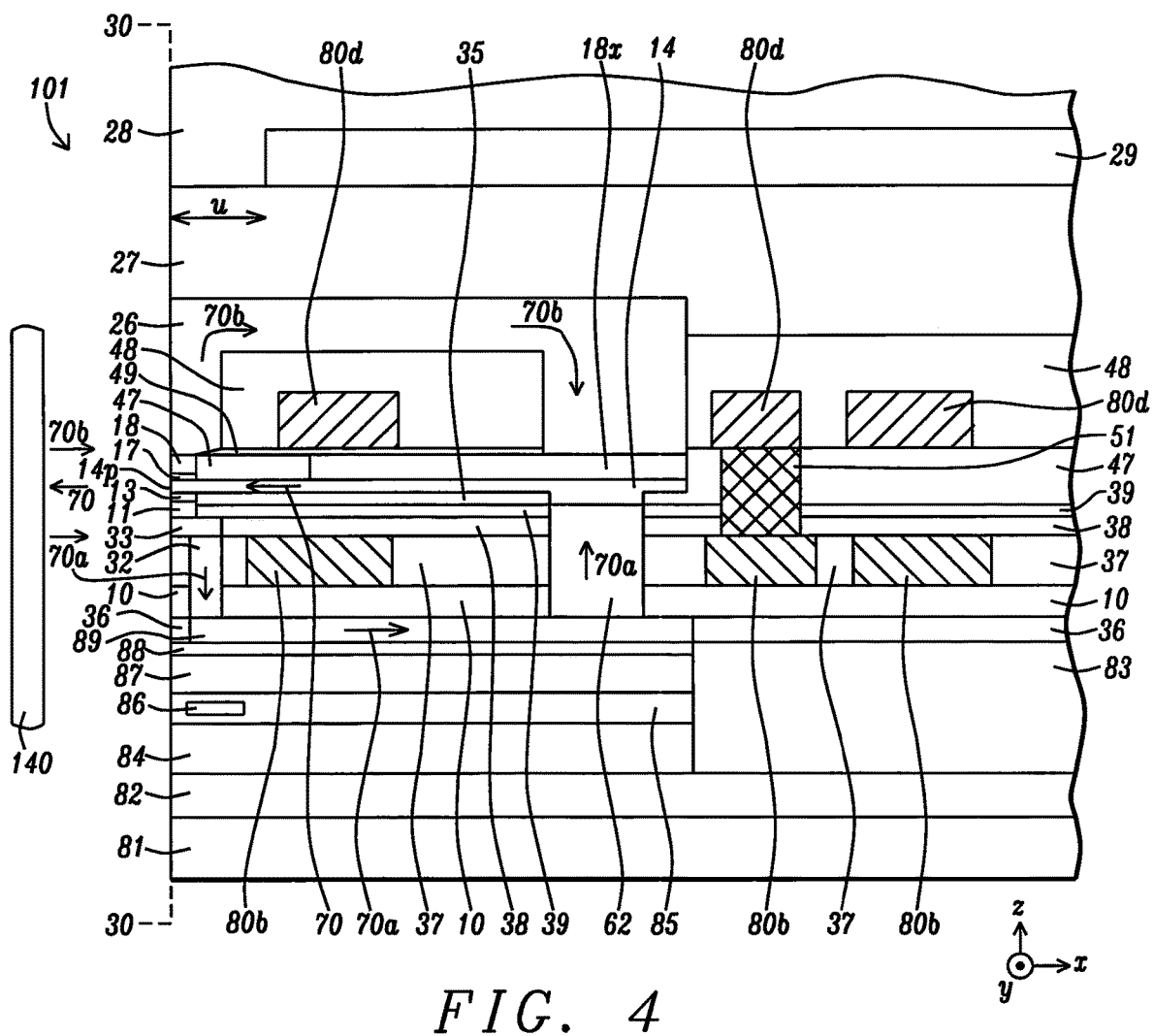
FIG. 4 is a down-track cross-sectional view of a combined read-write head with leading and trailing loop pathways for magnetic flux return to the main pole according to an embodiment of the present disclosure.

Referring to FIG. 4, magnetic recording head 101 comprises a combined read-write head. The down-track cross-sectional view is taken along a center plane (44-44 in FIG. 16A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in MP 14 is generated with flowing a current through bucking coil 80b and driving coil 80d that are below and above the main pole layer, respectively, and are connected by interconnect 51. Magnetic flux 70 exits the MP at pole tip 14p at the ABS 30-30 and is used to write a plurality of bits on magnetic media 140. Magnetic flux 70b returns to the MP through a trailing loop comprised of trailing shields 17, 18, uppermost trailing (PP3) shield 26, and top yoke 18x. There is also a leading return loop for magnetic flux 70a that includes leading shield 11, leading shield connector (LSC) 33, S2 connector (S2C) 32, return path (RTP) 89, and back gap connection (BGC) 62. The magnetic core may also comprise a bottom yoke 35 below the MP. Dielectric layers 10, 13, 36-39, and 47-49 are employed as insulation layers around magnetic and electrical components. A protection layer 27 covers the PP3 shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head. In other embodiments (not shown), the leading return loop is shortened with the removal of one or more of the BGC, RTP, S2C, and LSC to force more return flux 70b through the trailing loop.

Figure 5A:
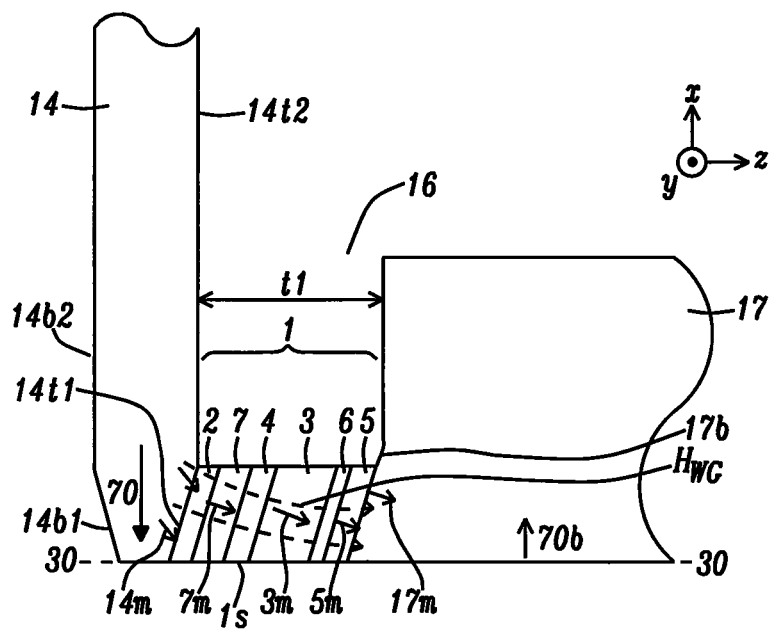
FIG. 5A shows a STO device known to the inventors wherein a SP layer and SIL are on opposites sides of a FGL in a WG, and FIG. 5B indicates that the FGL magnetization is flipped opposite to a WG field direction when a current is applied across the device and the SP layer and SIL provide spin torque on the FGL.

Referring to FIG. 5A, a writer known to the inventors, and capable of providing a MAMR assist and a STRAMR assist, is depicted. There is a MP 14 with a sufficiently large local magnetic field 70 to write the media bit 9 with magnetization 9m on medium 140. Magnetic flux 70 in the MP proceeds through the ABS 30-30 and into medium bit layer 142 and soft underlayer (SUL) 141. A portion of the flux 70b is collected by trailing shield 17 and then returns to the MP through a trailing loop (shown in FIG. 4). STO device 1 has a front side Is at the ABS, and is formed on the MP tapered trailing side 14t1, which connects with a MP top surface 14t2 that is aligned orthogonal to the ABS. The MP leading side 14b1 is also tapered and connects with the MP bottom surface 14b2. In other embodiments (not shown), one or both of the MP trailing and leading sides may be orthogonal to the ABS. Write gap field $H_{WG}$ is shown across the STO device in a direction from the MP to trailing shield (TS) 17 during a write semi-cycle in the exemplary embodiments where the write field 70 is pointing down. In other embodiments (not shown) representing another write semi-cycle where write field is pointing up, $H_{WG}$ would point from the TS to the MP. WG 16 has a thickness t1 from MP bottom surface 14b2 to TS side 17b that contacts the STO device. Each of the MP and TS is comprised of a magnetic material such as FeNi, FeCo, FeCoNi, or FeCoN. The MP typically has a saturation magnetization (Ms) value of about 24 kilo Gauss (kG) while the TS has a Ms from 19 kG to 24 kG.

STO device 1 comprises a stack of layers wherein a spin sink (pxL) 2, spin injection layer (SIL) 7, first non-magnetic spacer (ppL1) 4, FGL 3, second non-magnetic spacer (ppL2) 6, and spin polarization (SP) layer 5 are sequentially formed on MP trailing side 14t1. The pxL is a non-spin polarization preserving layer meaning that electrons have a substantial spin flipping scattering rate such that spin polarization is randomized and the net spin polarization in electrons transiting the pxL is effectively lost. The pxL is an alloy or multilayer made of one or more materials including but not limited to Cr, Ir, NiCr, Ta, W, Pt, Pd, Rh, and Ti and Ru. The ppL1 and ppL2 are spin polarization preserving layers comprised of one or more non-magnetic materials such as Cu, Au, Ag, Ru, and Al or alloys thereof with sufficient spin diffusion length to allow spin polarization in essentially an unaltered orientation for electrons traversing through ppL1 and ppL2.

FGL 3, SP layer 5, and SIL 7 are magnetic layers made of a material with a spin polarization ≥0.4 that is one or more of Fe, Ni, and Co, or alloys thereof with one or more of B, Mo, Pt, Pd, and W, for example. It is important that the FGL has a sufficiently small Ms×thickness (Mst) value and a damping constant preferably less than 0.02 to allow FGL magnetization 3m to flip to a direction substantially opposite to $H_{WG}$ as a result of spin torque generated by reflected (back scattered) spin polarized electrons from the SIL and SP layer. Preferably, the SIL has a Mst less than that of the FGL so that after FGL magnetization 3m is driven into a precessional state 3p or 3p' (see FIG. 15), the SIL can be quickly driven into a precessional state (not shown) at a reasonable current density not much higher than that used to drive the FGL. Returning to FIG. 5A, SP layer magnetization 5m is FM coupled to TS magnetization 17m proximate to TS side 17b so that magnetization 5m is essentially unaffected by spin polarized electrons passing through the SP layer. Note that local MP magnetization 14m that is proximate to MP trailing side 14t1 as well as magnetizations 7m, 5m, 3m, and 17m are all pointing substantially in the direction of the WG field $H_{WG}$ in the absence of an applied current across STO device 1.

Figure 5B:
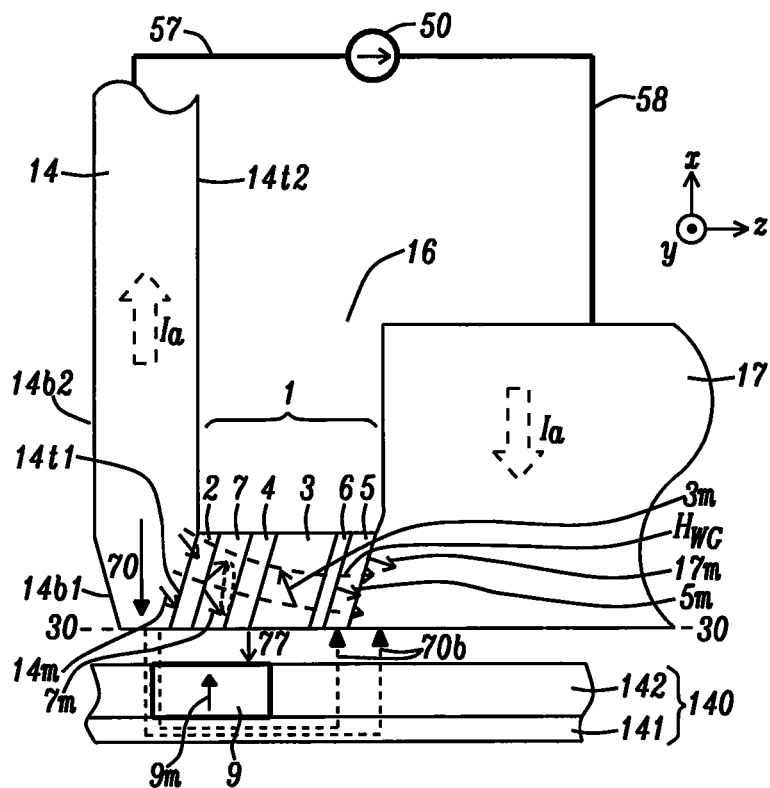
Figure 15:
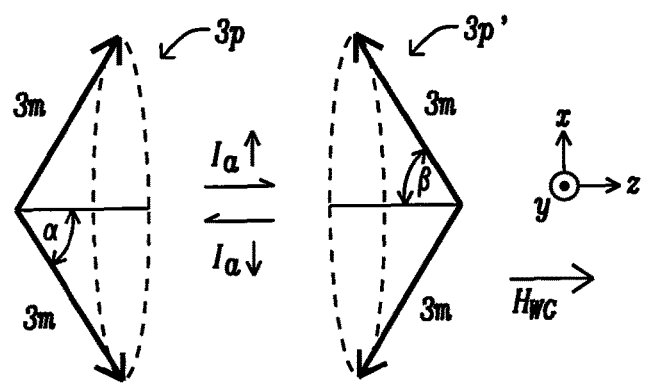
FIG. 15 illustrates cone angles of a FGL magnetization in a precessional state before and after flipping according to an embodiment of the present disclosure.

Referring to FIG. 5B, the STRAMR aspect involves the application of a current (Ia) across STO device 1 and in a direction from TS 17 to MP 14. In an alternative embodiment (not shown) where the order of layers in STO 1 is reversed, then the direction of Ia is also reversed. Thus, the Ia from DC source 50 is applied through lead 58 to the TS and through STO device 1 to the MP and then returns through lead 57 to the DC source. The Ia is spin polarized by SP layer 5 and SIL 7, and produces a spin torque on both sides of the FGL that drives FGL magnetization 3m into a precessional state 3p. When the Ia reaches a current density of about $1\times10^6$ Amps/cm$^2$ to $1\times10^8$ Amps/cm$^2$, FGL magnetization 3m flips from a precessional state 3p with cone angle α to precession state 3p' with cone angle β wherein the former is substantially aligned with $H_{WG}$ while the latter is substantially aligned opposite to $H_{WG}$ as shown in FIG. 15. As Ia current density increases, cone angle β becomes smaller until approaching 0 degrees where a maximum STRAMR effect is achieved and the MAMR assist is essentially zero. However, oscillations in the SIL and SP layer may continue to provide a MAMR assist. Note that FGL magnetization is not shown in a precessional state in FIG. 5B in order to more clearly depict the extent of FGL flipping. Meanwhile, each of SP layer 5 and SIL 7 are driven into an oscillation state that produces a radio frequency (RF) field 77 (MAMR assist) on bit magnetization 9m.

Although the prior art STO device in FIGS. 5A-5B provides a STRAMR effect, a more efficient STO configuration is desired so that a lower Ia current density may be applied to achieve the same degree of FGL flipping, or so that a higher degree of FGL flipping is achieved at a given Ia current density. Accordingly, improved device reliability and better BER are expected.

Figure 6A:
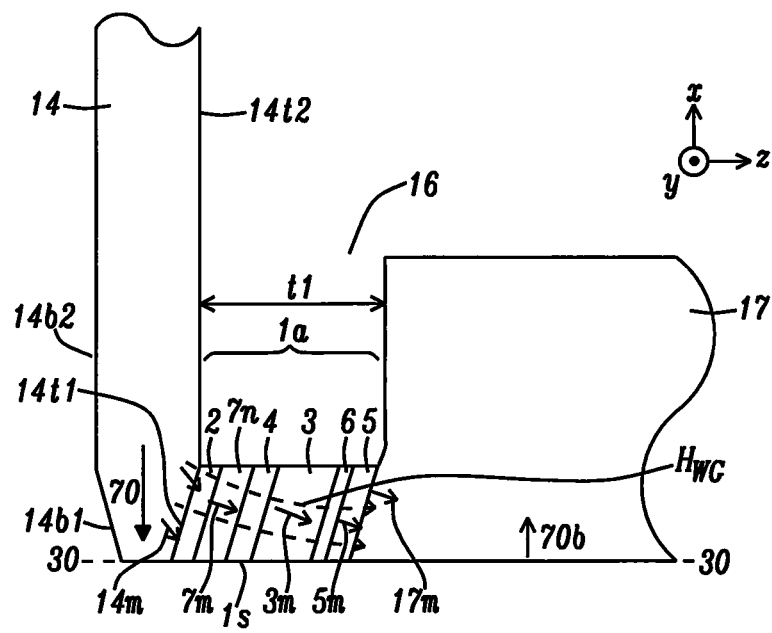
FIGS. 6A-6B depict a modification of the STO device in FIG. 5A and FIG. 5B, respectively, where the SIL is replaced with a nSIL such that the FGL magnetization is flipped at a lower Ia current density than applied in FIG. 5B according to a first embodiment of the present disclosure.

According to a first embodiment of the present disclosure that comprises STO 1a in FIG. 6A, the features of FIG. 5A are retained except the SIL is replaced with nSIL 7n that is made of a material with a spin polarization that is negative or weakly positive (in the range of −0.4 to 0.3), and is preferably an alloy of one or more of Fe, Co, and Ni with Cr, V, and Mn, or a multilayer thereof. In some embodiments, the nSIL may further comprise a dopant such as B, C, or N to improve the reliability of the device. Each of pxL 2, ppL1 4, and ppL2 6 has a thickness from 1 nm to 4 nm. In addition to the ppL1 materials mentioned earlier, Cr, V, or an alloy or multilayer thereof may be used as ppL1 when adjoining one or more magnetic layers (nSIL and/or nFGL) with negative spin polarization (P0). Each of nSIL 7n, FGL 3, and SP layer 5 has a thickness from 2 nm to 4 nm, and a Ms from 6-15 kG. FGL thickness may be as high as 8 nm, and the SP layer Ms may be as high as 24 kG. In some embodiments, WG thickness t1 may be less than 25 nm. Preferably, the SIL Mst is 1-4 nmT (nm×Tesla product), and the FGL Mst is >4 nmT and may be as high as 17 nmT. A low FGL Mst is defined as a moment in the range of 4-8 nmT and a high FGL Mst is >10 nmT.

Figure 6B:
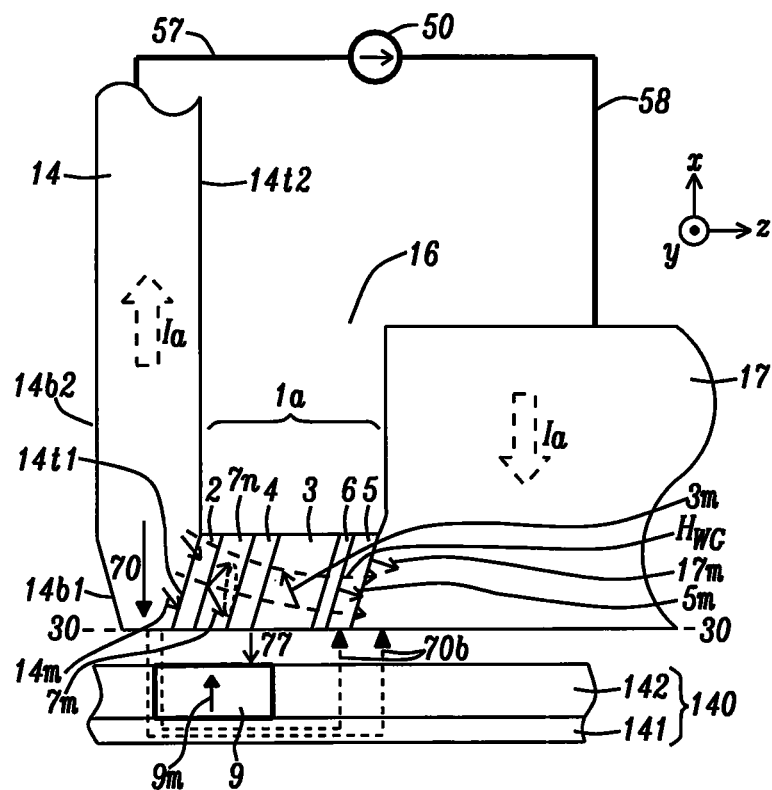

Referring to FIG. 6B, the results from the application of Ia from TS 17 to MP 14 and across STO device 1a are similar to that depicted in FIG. 5B except the degree of FGL flipping is greater such that magnetization 3m is more anti-parallel to $H_{WG}$ (at the same applied current density) than in the prior art. Similarly, at lower applied current density where FGL flipping does not occur, magnetization 3m is expected to have a larger precessional cone angle and provide a larger MAMR assist than the prior art. Accordingly, there is a greater boost to MP write field 70 or a larger MAMR assist at the same Ia current density used in FIG. 5B. Furthermore, we observe better BER as described later. It should be understood that the flow of electrons is from the MP 14 to TS 17 when the Ia direction is from the TS to MP. Ia is spin polarized in each of the magnetic layers, and reflected spin polarized electrons from the TS then transit SP layer 5 to generate a first spin torque on FGL magnetization 3m. The first spin torque is depicted as 5t in FIG. 10 that shows spin torque direction as Ia current density is increased. Simultaneously, Ia is spin polarized by SIL (or nSIL) and generates a second spin torque (7t in FIG. 10) on FGL magnetization 3m that at certain Ia current densities is additive with first spin torque 5t.

Figure 10:
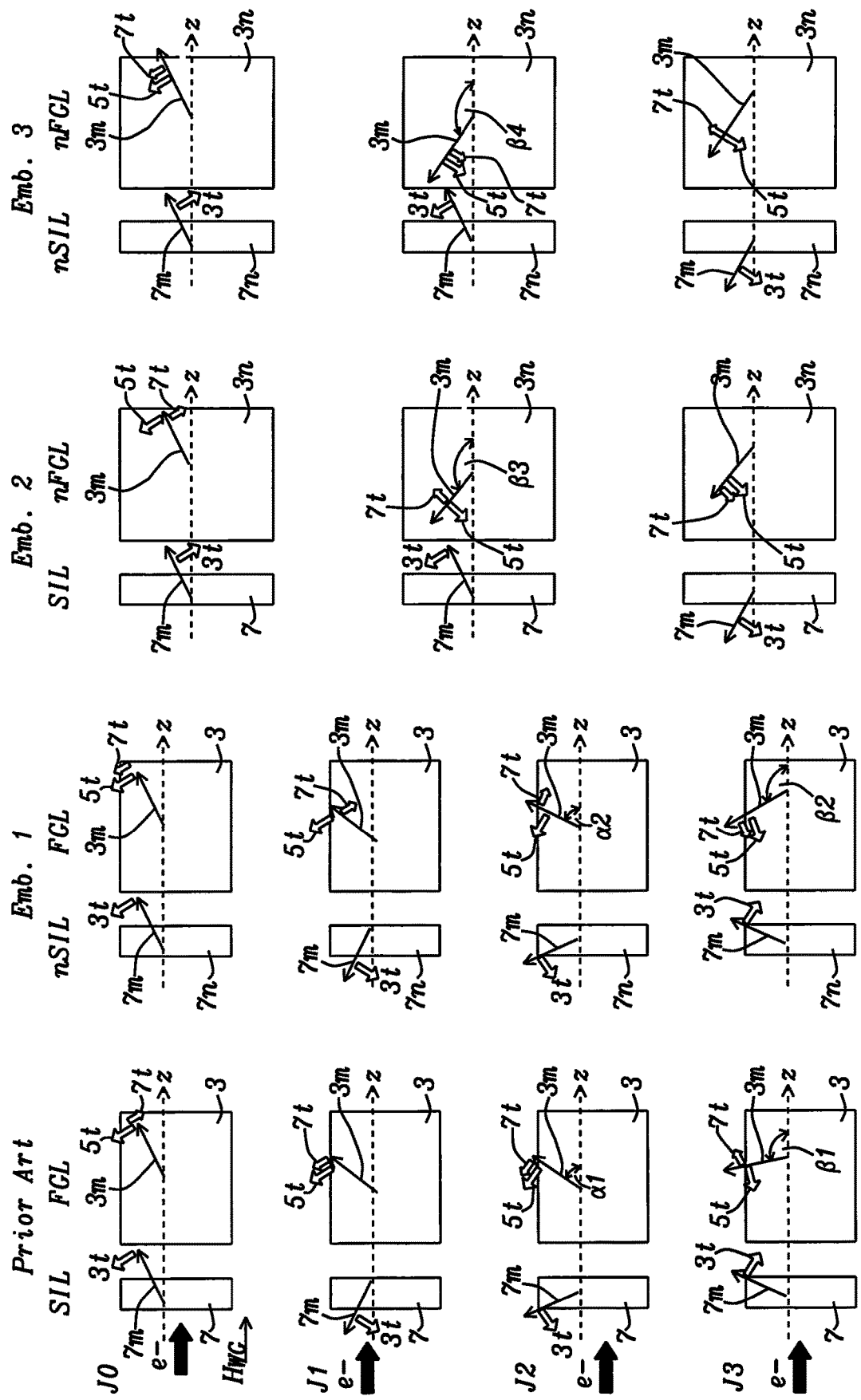
FIG. 10 illustrates how spin torque from the SIL and SP layer in the prior art tilt FGL magnetization to varying degrees depending on the Ia current density, and how spin torque from the nSIL (or SIL) and the SP layer tilt the FGL (or nFGL) magnetization to a greater extent at the same Ia current densities in the first through third embodiments.

Referring to FIG. 10, the effect of increasing Ia current density from J0 to J1, then to J2, and finally to J3 is illustrated. In each column below the Prior Art, and Embodiment 1-3 examples, only the SIL 7 (or nSIL 7n) and FGL 3 (or nFGL 3n) are shown with the electron flow from left to right in the z-axis direction. At a low current density proximate to 0 (J0) in the prior art example from FIG. 5B, both of SIL magnetization 7m and FGL magnetization 3m remain substantially in the $H_{WG}$ direction. Note that the first and second spin torques 5t and 7t, respectively, are in opposition, and FGL 3 produces a spin torque 3t on SIL magnetization 7m due to a back flow of spin polarized electrons from the FGL. At a higher current density (J1), spin torques 5t and 7t are additive but still not sufficient to flip FGL magnetization to a direction opposing $H_{WG}$. Moreover, when SIL 7 has a low Mst value, magnetization 7m is flipped at J1. At J2, spin torques 5t and 7t continue to be additive but are still insufficient to flip the FGL magnetization (angle α1) while SIL magnetization remains flipped. Finally, at J3, there is sufficient current density so that first spin torque 5t is large enough to flip the FGL magnetization to an angle β1 (>90°) with respect to the z-axis direction. However, second spin torque 7t opposes the first spin torque, which means that a flip angle greater than β1 would be realized if the first and second spin torques were still additive. Also at J3, spin torque 3t is now substantially aligned with $H_{WG}$ and is sufficient to flip SIL magnetization to again be substantially aligned with $H_{WG}$.

Since SIL magnetization 7m direction at J3 is only slightly less than 90° with respect to the z-axis and FGL Mst is larger than the SIL Mst and has magnetization 3m substantially opposing $H_{WG}$, the net effect is to increase reluctance in the WG and thereby enhance the MP write field for a STRAMR assist to the write process. Alternatively, at lower current density J2, Embodiment 1 provides a greater MAMR assist in that precessional angle α2 is larger than α1. In some embodiments, both of a MAMR assist and STRAMR assist may occur simultaneously, but the main objective of the present disclosure in the second and third embodiments, especially, is to optimize the STRAMR assist for the benefits of a lower Ia current density (improved device reliability) and better BER. As indicated with the Embodiment 1 column in FIG. 10, a larger FGL flip angle (β2>β1) is achieved at the same Ia current density (J3) compared with the prior art by replacing SIL 7 with nSIL 7n because first spin torque 5t is additive with second spin torque 7t on FGL magnetization 3m at J3. Magnetization 7m for nSIL 7n is again proximate to 90° with respect to the z-axis direction and has a negligible effect on reducing the gain in WG reluctance from FGL magnetization flipping.

Figure 7:
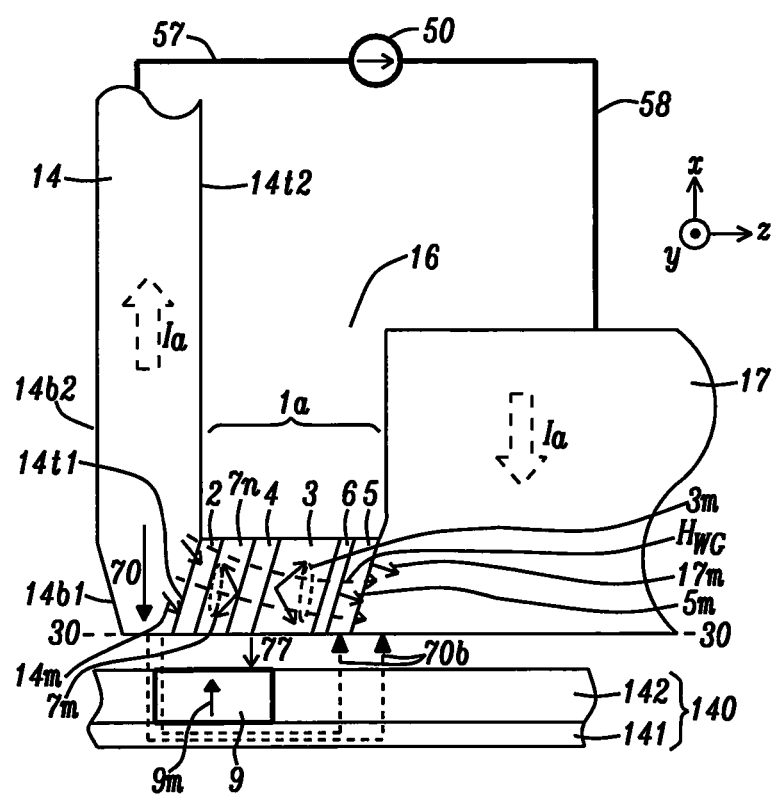
FIG. 7 depicts the STO device in FIG. 6B wherein the nSIL has a sufficient large Mst value so that the FGL magnetization does not flip at the same Ia current density used to flip the FGL in FIG. 6B.

Referring to FIG. 7, an example is shown where nSIL 7n in the first embodiment has a substantial Mst value that is greater than 1 nmT. Although nSIL magnetization 7m flips to a direction substantially opposing $H_{WG}$, FGL magnetization 3m does not flip even at the J3 current density described previously. Therefore, a less desirable result is achieved since WG reluctance (or a MAMR assist at J2) is not increased to the same extent as in the first embodiment.

Figure 8A:
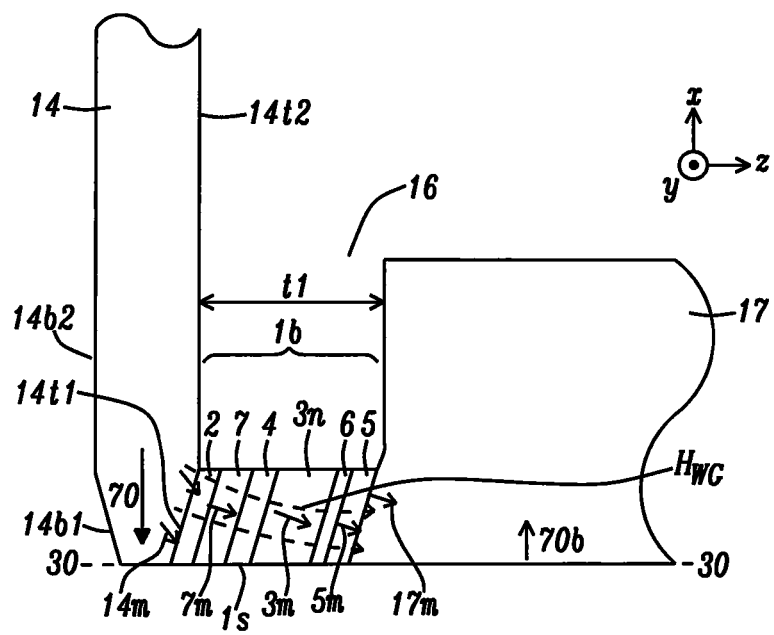
FIGS. 8A-8B depict a modification of the STO device in FIG. 5A and FIG. 5B, respectively, where the FGL is replaced by a nFGL so that the nFGL magnetization is flipped at a lower Ia current density than the FGL magnetization in FIG. 6B according to a second embodiment of the present disclosure.

According to a second embodiment of the present disclosure illustrated in FIG. 8A and that comprises STO 1b with a pxL/SIL/ppL1/nFGL/ppL2/SP layer configuration. FGL 3 in FIG. 5A is replaced with nFGL 3n that material with a spin polarization from −0.4 to 0.3, and is preferably an alloy of one or more of Fe, Co, and Ni with Cr, V, and Mn, or a multilayer thereof. The present disclosure also anticipates the nFGL may further comprise a dopant such as B, C, or N. All other features of STO 1 in FIG. 5A are retained. When the MP magnetic field 70 is pointing down out of the ABS 30-30, magnetizations 7m, 3m, and 5m for the SIL, nFGL, and SP layer, respectively, are all substantially aligned with $H_{WG}$ and pointing toward TS 17 in the absence of an applied current across STO 1b.

Figure 8B:
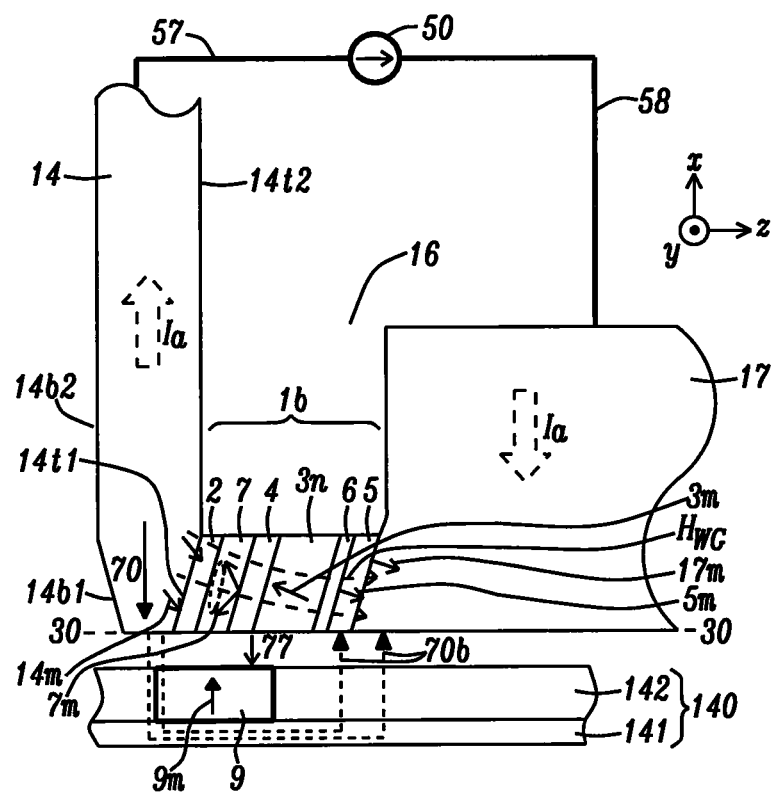

Referring to FIG. 8B, when Ia from DC source 50 is applied through lead 58 to TS 17, and then across STO 1b to MP 14 before returning to the source through lead 57 during a write process, nFGL magnetization 3m flips to a direction substantially opposing $H_{WG}$. As shown in FIG. 10, nFGL flipping occurs at a current density in a range of J1-J2, and significantly less than J3, which is an advantage over the first embodiment. Moreover, nFGL flipping angle is β3 where β3>β2 to provide a greater boost to the MP write field at the lower current density. Although SIL magnetization 7m is still aligned with $H_{WG}$ in the J1-J2 range, SIL magnetization flips to be substantially opposing $H_{WG}$ at J3 as indicated in FIG. 8B. Accordingly, at the same current density required for FGL magnetization flipping in the first embodiment, there is a substantially greater enhancement to WG reluctance (and the MP write field) because both magnetizations 7m and 3m now oppose $H_{WG}$, and the nFGL magnetization is flipped to a greater extent than FGL magnetization in FIG. 6B.

Figure 9A:
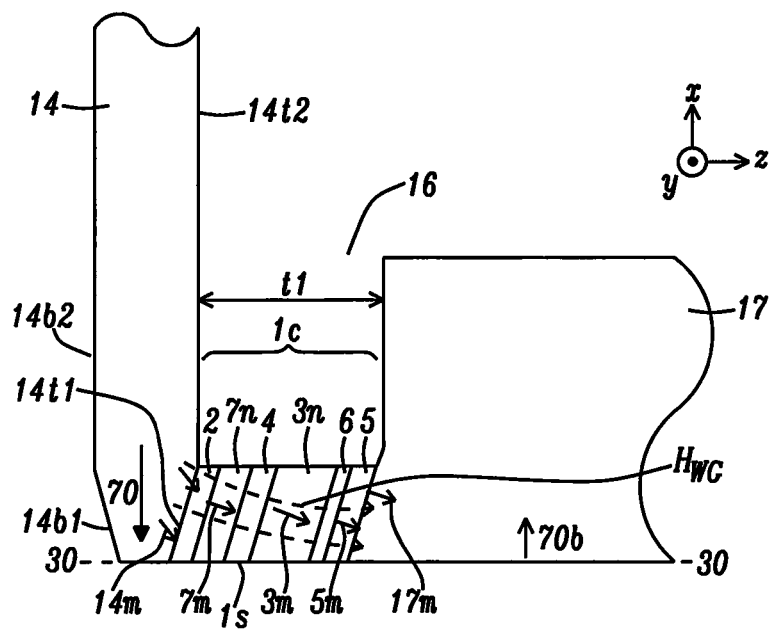
FIGS. 9A-9B depict a modification of the STO device in FIG. 6A and FIG. 6B, respectively, where the FGL is replaced by a nFGL so that the nFGL magnetization is flipped at a lower Ia current density than in FIG. 8B according to a third embodiment of the present disclosure.

A third embodiment of the present disclosure comprises STO 1c and is depicted in FIG. 9A. All features are retained from the second embodiment except the SIL is replaced with nSIL 7n to provide two layers having a spin polarization from −0.4 to 0.3 in the STO that has a pxL/nSIL/ppL1/nFGL/ppL2/SP layer configuration. Magnetizations 7m, 3m, and 5m for the nSIL, nFGL, and SP layer, respectively, are substantially aligned with $H_{WG}$ in the absence of an applied current.

Figure 9B:
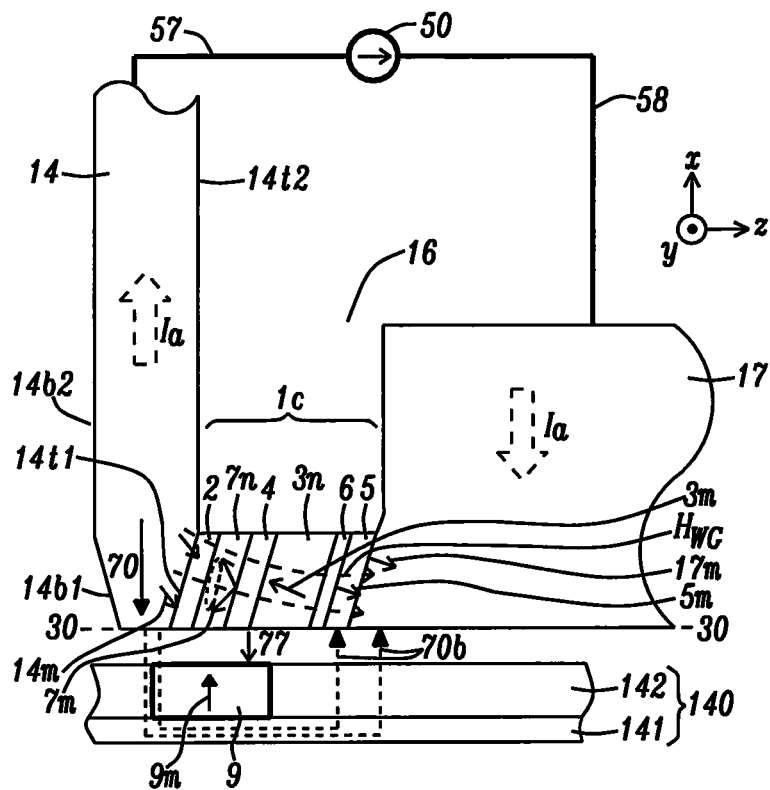

FIG. 9B shows that when Ia is applied across STO 1c to from TS 17 to MP 14 during a write process, nFGL magnetization 3m flips to a direction substantially opposing $H_{WG}$. As indicated in FIG. 10, nFGL flipping occurs at a current density in a range of J1-J2, and significantly less than J3, which is an advantage over the first embodiment. Furthermore, nFGL flipping angle is β4 where β4>β3 to provide an even greater boost to the MP write field at the same current density compared with the second embodiment because both spin torques 5t and 7t are additive on nFGL magnetization 3m in the J1-J2 range rather than opposed as in the Embodiment 2 column. Although nSIL magnetization 7m remains substantially aligned with $H_{WG}$ in the J1-J2 range, nSIL magnetization flips to be substantially opposing $H_{WG}$ at J3. As a result, at the same current density required for FGL magnetization flipping in the first embodiment, there is a substantially greater enhancement to WG reluctance and MP write field because both magnetizations 7m and 3m oppose $H_{WG}$, and the nFGL magnetization is flipped to a greater extent than FGL magnetization in FIG. 6B.

Figure 11A:
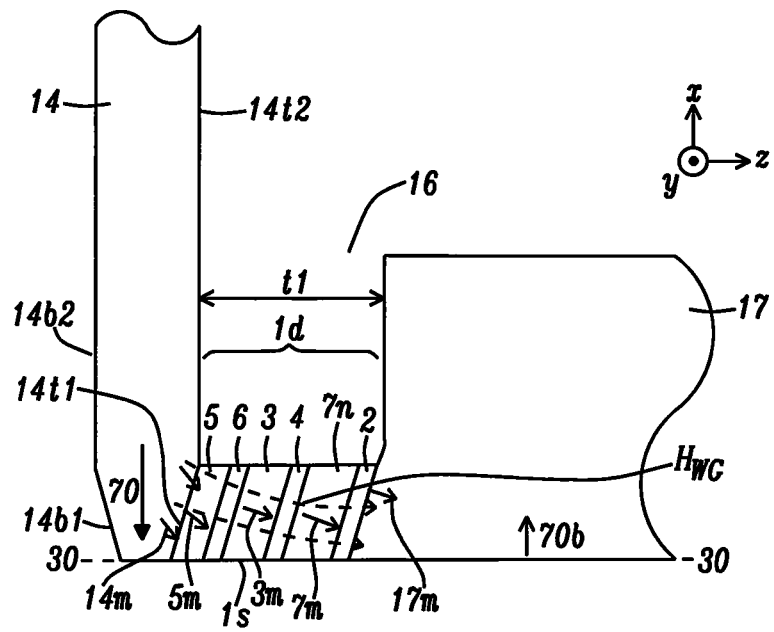
FIGS. 11A-11B depict a fourth embodiment of the present disclosure wherein the order of STO device layers in FIG. 6A and FIG. 6B, respectively, is reversed so that the SP layer is coupled to the MP and the nSIL is adjacent to the TS.

Referring to FIG. 11A, the present disclosure encompasses a fourth embodiment comprising STO d where the STO layers in STO 1a are retained but the stacking order is reversed such that SP layer 5, ppL2 6, FGL 3, ppL1 4, nSIL 7n, and pxL 2 are sequentially formed on MP trailing side 14t1, and where the pxL contacts TS 17. When the MP write field is pointing out of the ABS 30-30, the WG field $H_{WG}$ is in a direction from the MP to the TS, and magnetizations 5m, 3m, and 7m for the SP layer, FGL, and nSIL, respectively, are substantially aligned with $H_{WG}$ in the absence of an applied current across the STO device.

Figure 11B:
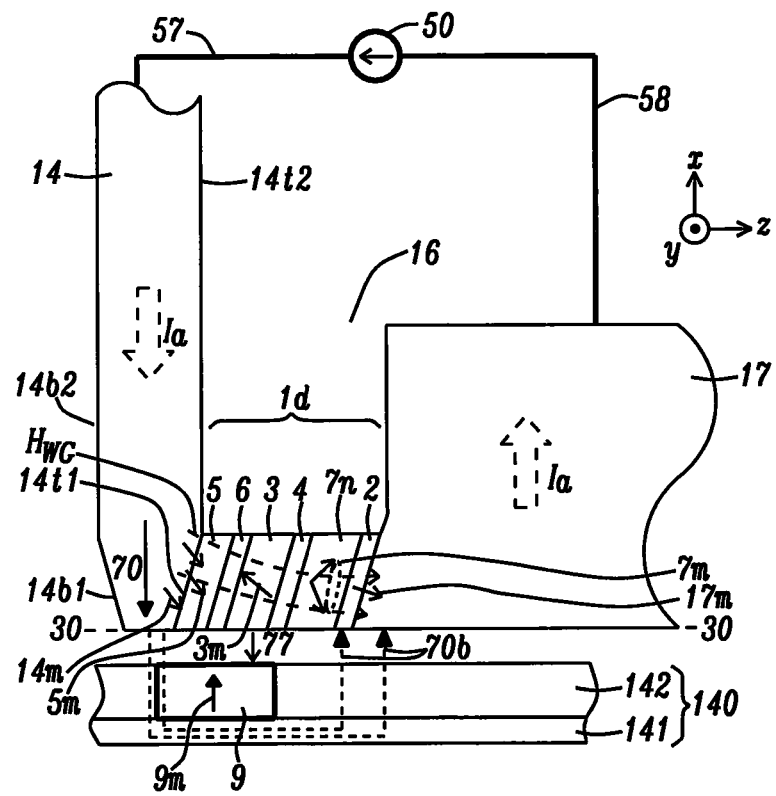

In FIG. 11B, when Ia is applied from MP 14 across STO 1d to TS 17, a STRAMR assist essentially equivalent to that realized in the first embodiment occurs. In particular, at sufficient current density similar to J3 in the Embodiment 1 example in FIG. 10, FGL magnetization 3m flips to a direction substantially opposing $H_{WG}$ and with flipping angle β2 thereby enhancing the MP write field 70 compared with β1 in the prior art. Meanwhile, nSIL magnetization 7m and SP layer magnetization (not shown) are in precessional states that are substantially aligned with $H_{WG}$ and generate a RF field 77 (MAMR assist) on the magnetic medium 140.

Figure 12A:
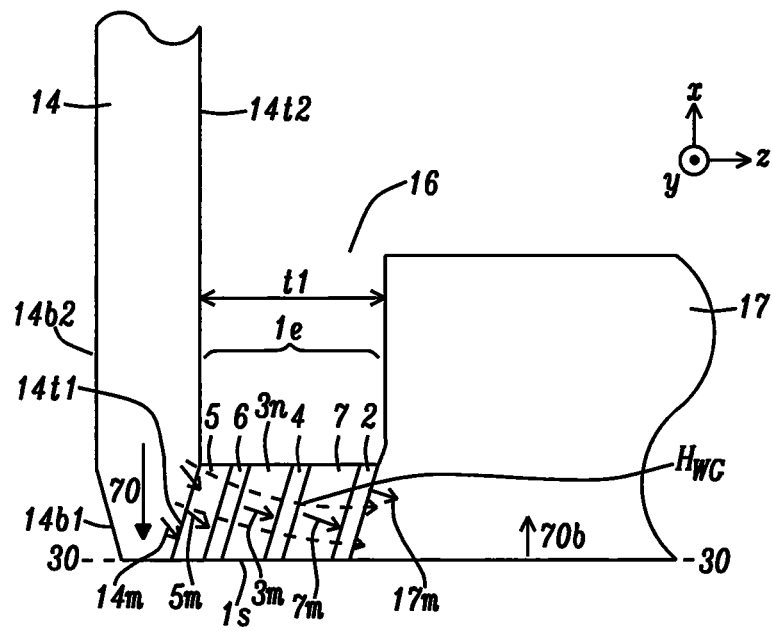
FIGS. 12A-12B depict a fifth embodiment of the present disclosure wherein the order of STO device layers in FIG. 8A and FIG. 8B, respectively, is reversed so that the SP layer is coupled to the MP and the SIL is adjacent to the TS.

A fifth embodiment of the present disclosure is depicted in FIG. 12A and is a modification of the second embodiment where all layers in STO 1b are retained, but the stacking order is reversed to give a SP layer/ppL2/nFGL/ppL1/SIL/pxL configuration for STO 1e. In the exemplary embodiment where the MP write field 70 is out of the ABS 30-30, each of SP magnetization 5m, nFGL magnetization 3m, and SIL magnetization 7m is aligned substantially parallel to $H_{WG}$ in the absence of an applied current across STO 1e.

Figure 12B:
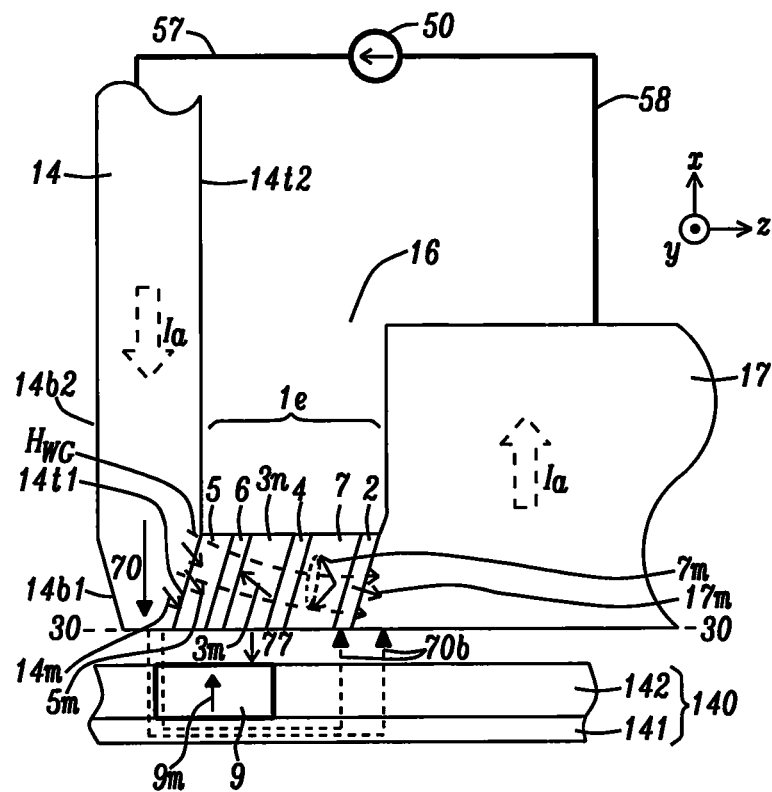

In FIG. 12B, when Ia is applied from MP 14 across STO 1e to TS 17, a STRAMR assist essentially equivalent to that realized in the second embodiment occurs. With an Ia current density in the J1-J2 range similar to the Embodiment 2 example in FIG. 10 (except with SIL and nFGL positions reversed, and e-direction reversed), nFGL magnetization 3m flips to a direction substantially opposing $H_{WG}$ with flipping angle β3 and thereby enhances the MP write field 70. Meanwhile, SIL magnetization 7m is in a precessional state that generates a MAMR assist on the magnetic medium 140, and if current density is increased to J3, flips to be opposing $H_{WG}$ for a further enhancement of the MP write field.

Figure 13A:
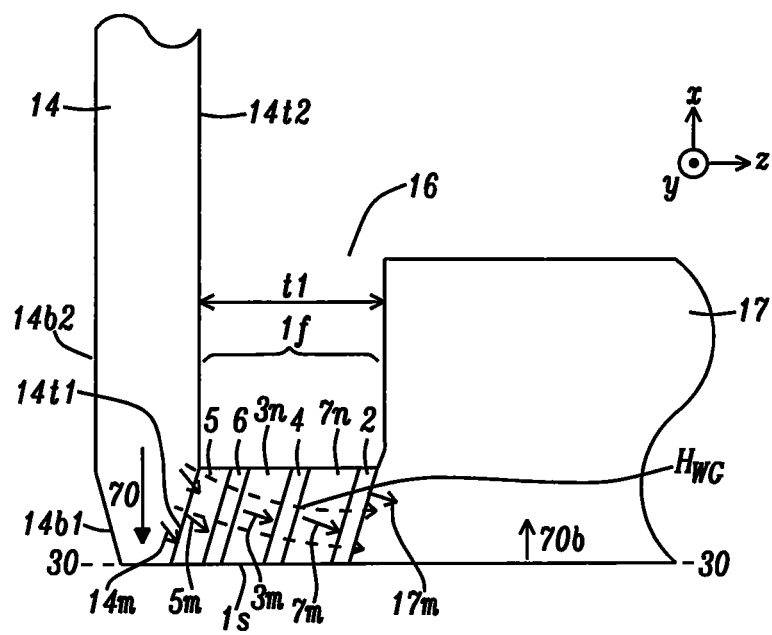
FIGS. 13A-13B depict a sixth embodiment of the present disclosure wherein the order of STO device layers in FIG. 9A and FIG. 9B, respectively, is reversed so that the SP layer is coupled to the MP and the nSIL is adjacent to the TS.

Referring to FIG. 13A, a sixth embodiment of the present disclosure comprising STO 1f is depicted and is a modification of the third embodiment where all layers are retained from STO 1c except the stacking order is reversed to give a SP layer/ppL2/nFGL/ppL1/nSIL/pxL configuration. Each of SP magnetization 5m, nFGL magnetization 3m, and nSIL magnetization 7m is aligned substantially parallel to $H_{WG}$ in the absence of an applied current across STO 1f.

Figure 13B:
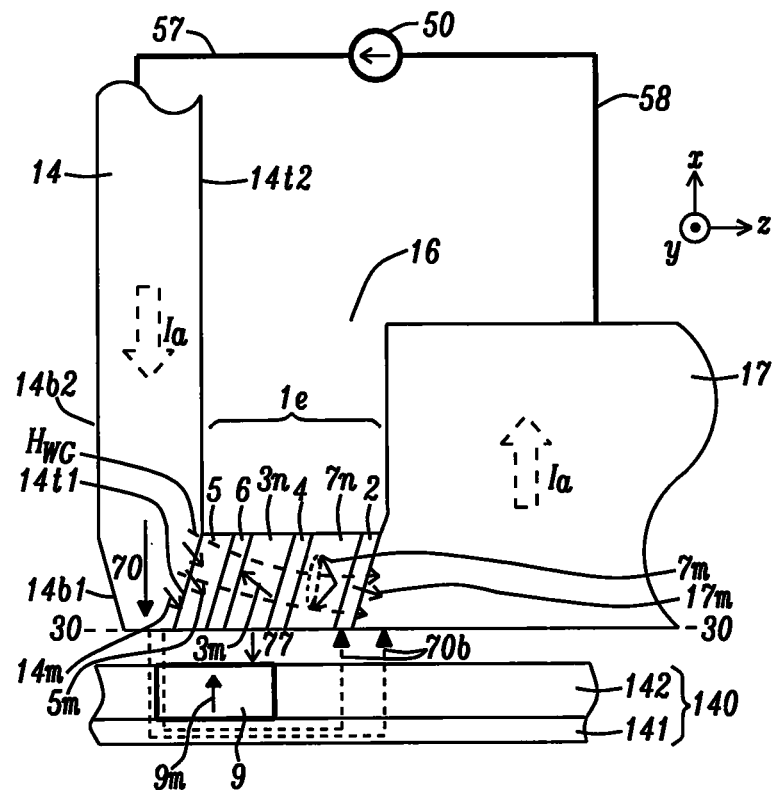

As shown in FIG. 13B, when Ia is applied from MP 14 across STO 1f to TS 17, a STRAMR assist essentially equivalent to that realized in the third embodiment occurs. With an Ia current density in the J1-J2 range similar to the Embodiment 3 example in FIG. 10 (except with nSIL and nFGL positions reversed, and e-direction reversed), nFGL magnetization 3m flips to a direction substantially opposing $H_{WG}$ with flipping angle β4 and thereby enhances the MP write field 70 compared with the prior art and Embodiments 1-2 (or Embodiments 4-5).

Meanwhile, nSIL magnetization 7m is in a precessional state that generates a MAMR assist on the magnetic medium 140, and if current density is increased to J3, flips to be opposing $H_{WG}$ for a further enhancement of the MP write field.

In all embodiments, the advantage of more efficient FGL (or nFGL) flipping at a given current density (compared with the prior art where all STO magnetic layers are made of a material with spin polarization ≥0.4) is associated with a greater write field 70 (and larger MAMR assist) during writing, and therefore improved bit error rate (BER) and area density capability (ADC) performance. Alternatively, the additive spin torque applied to FGL (or nFGL) magnetization 3m by the SP layer and SIL (or nSIL) from two opposite sides provides the advantage of a reduced Ia current density to achieve the same extent of FGL or nFGL flipping. Accordingly, there will be reduced power consumption and improved STO device reliability since a lower current density will cause less electromigration in metal spacers and reduce the risk of other breakdown mechanisms.

Referring to FIG. 15, FGL (or nFGL) magnetization 3m is not in a static state, but is typically in a dynamic state with a precession forming cone angle α around the z-axis in the direction of WG field $H_{WG}$ in precessional state 3p, or forming cone angle β after flipping at higher current density to be substantially opposing $H_{WG}$ in precessional state 3p'. As Ia current density increases further, and cone angle β approaches 0 degrees (anti-parallel to $H_{WG}$) there is a maximum STRAMR assist to enhance the MP write field 70. However, the FGL or nFGL will generate essentially no RF field on the magnetic medium for a MAMR assist when β is proximate to 0 degrees. Meanwhile, SP layer and SIL (or nSIL) oscillations are in a precessional state similar to 3p and produce a RF field typically having a frequency of 30-40 GHz to provide a MAMR assist, and a maximum MAMR assist when α is proximate to 90°.

Figure 14:
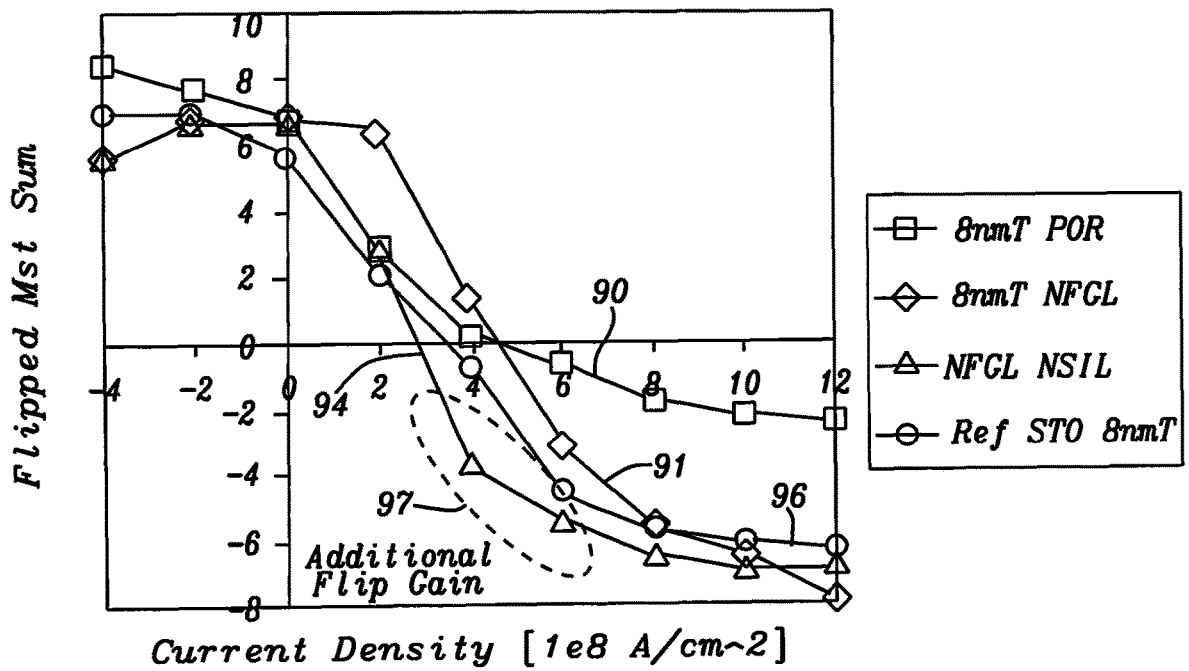
FIG. 14 is a plot that simulates the flipped Mst sum as a function of applied current density for various STO device configurations to illustrate the flip gain realized when one or both of an nSIL and nFGL are included in the STO device.

Referring to FIG. 14, a modeling study was performed where the effective flipped Mst sum is plotted for an Ia current density of $-4 \times 10^8$ Amps/cm$^2$ to $+12 \times 10^8$ Amps/cm$^2$. The flipped Mst sum relates to the total moment that is perpendicular to the planes of the STO layers and includes contributions from both of the FGL (or nFGL) and SIL (or nSIL). A negative value means against the WG field ($H_{WG}$) and a positive value means substantially parallel to $H_{WG}$. Curve 90 shows the results for STO device 1 that was described previously (FIG. 5A-5B) and operating for an optimal MAMR effect where both of the SIL and FGL have a large precessional angle (α proximate to 90° in FIG. 15). In this example, FGL Mst is 8 nmT (nm×Tesla product) and the SIL has a Mst of 2 nmT. Curve 91 illustrates results for the second embodiment of the present disclosure (STO device 1b in FIG. 8A) that comprises a SIL (Mst=2 nmT), and an nFGL (Mst=8 nmT) made of a material with a negative spin polarization value of −0.2. Note that additional flip gain is achieved for curve 91 vs. curve 90 at current densities greater than about $5 \times 10^8$ Amps/cm$^2$. We do not expect an advantage (not shown) in lower applied current for FGL flipping in the first embodiment compared with STO 1. However, a faster increase in precessional angle α is anticipated over the usable applied current density range, which means a greater MAMR assist for STO 1a at a given current density compared with STO 1.

Curve 94 shows the results for the third embodiment (STO device 1c in FIG. 9A) that comprises an nFGL and an nSIL having a Mst of 7 nmT and 2 nmT, respectively. Curve 96 illustrates results for a reference STO in FIGS. 8A-8B of related U.S. Pat. No. 10,424,326 where a SP layer and an antiferromagnetically coupled SP layer are formed on opposite sides of a FGL to minimize the applied current needed to flip the FGL precessional state (to angle β in FIG. 15). The region where additional flip gain is realized for the third embodiment compared with the reference STO is indicated within oval 97.

Dynamic performance (DP) testing (meaning the head is flying above the media to test recording properties) results indicate there is a BER gain (BER vs. device voltage slope) of 5-30% by incorporating a STO according to the third embodiment of the present disclosure in a writer compared with a conventional MAMR device (STO 1) or a prior art STRAMR device in related U.S. Pat. No. 10,424,326. The BER gain associated with the second embodiment is about 5-10% less than that of the third embodiment, but is expected to provide a significant advantage over the prior art in related U.S. Pat. No. 10,424,326 at current densities above $6 \times 10^8$ Amps/cm$^2$.

Figure 16A:
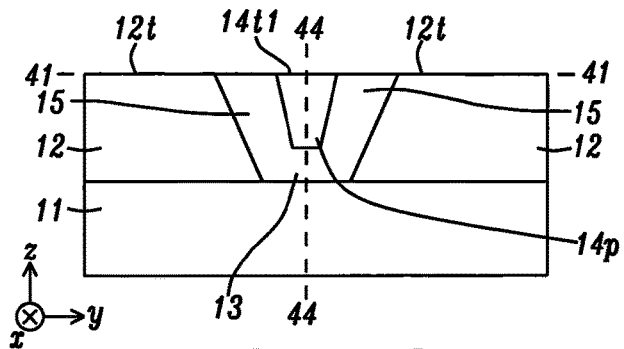
FIG. 16A and FIG. 16B show an ABS view and down-track cross-sectional view, respectively, of a first step in the process of forming a STO device of the present disclosure where a tapered trailing side is formed on the main pole.
Figure 16B:
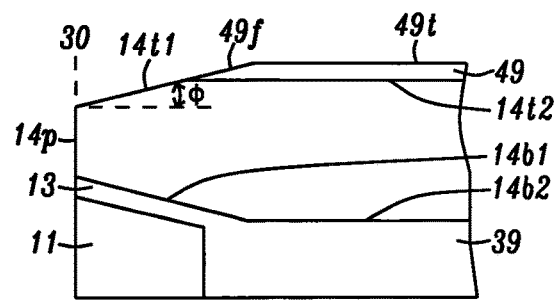

The present disclosure also encompasses a process sequence for fabricating a STO device according to an embodiment described herein and is provided in FIG. 16A through FIG. 21. The partially formed writer structure including MP tip 14p that adjoins side gaps 15 and leading gap 13 in FIG. 16A is provided according to a conventional process sequence. Side shield top surfaces 12t are coplanar with a trailing edge of the MP tapered trailing side 14t1 at plane 41-41, which is orthogonal to the subsequently formed ABS plane. FIG. 16B shows the down-track cross-sectional view at plane 44-44 in FIG. 16A. MP tapered trailing side 14t1 has a taper angle φ and is coplanar with a tapered front side 49f of dielectric layer 49 made of Al$_2$O$_3$ or SiO$_2$ that is formed on MP top surface 14t2. Note that the eventual ABS, hereafter referred to as ABS plane 30-30, is not determined until a lapping process is performed after all layers in the writer structure are formed.

Figure 17:
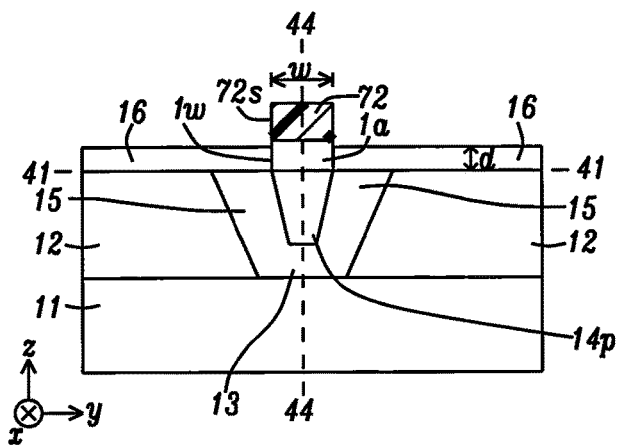
FIG. 17 shows an ABS view of the writer structure in FIG. 16A after a STO stack of layers is deposited and patterned to establish a STO device with a cross-track width, and then a write gap is deposited that adjoins the STO device sides.

In FIG. 17, a STO stack of layers described previously with regard to the first embodiment is deposited on the MP tapered trailing side 14t1 and on dielectric layer 49. The STO stack of layers is preferably conformal to the underlying topography and has a uniform thickness. Next, a first photoresist layer is coated on the STO stack of layers, and is patternwise exposed and developed to provide a photoresist mask 72 having sides 72s and a cross-track width w that is bisected by plane 44-44. The photoresist mask pattern is etch transferred through the STO stack of layers using a RIE process, for example, thereby forming STO device 1a with sides 1w separated by width w. In some embodiments, the RIE process may simultaneously generate a backside on STO device 1a. Thereafter, WG layer 16 with thickness d is deposited on the side shields 12 and side gaps 15.

Figure 18:
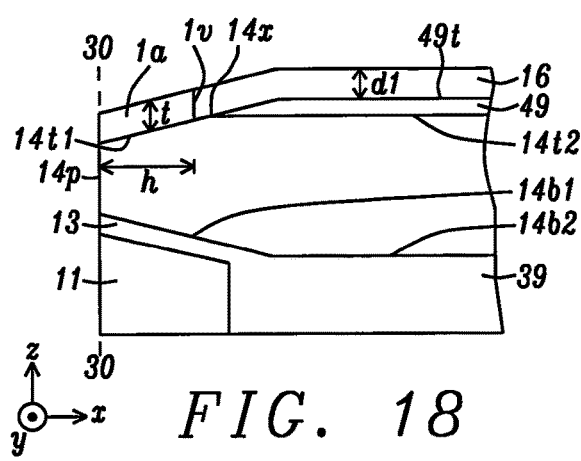
FIG. 18 is a down-track cross-sectional view of the writer structure in FIG. 17 after a second patterning step is used to form a backside on the STO device and a write gap is deposited behind the STO device.

Referring to FIG. 18, a down-track cross-sectional view at plane 44-44 is depicted for the partially formed writer structure after photoresist mask 72 is removed by a conventional method. STO device 1a has a front side Is at the ABS plane 30-30, a backside 1v at height h from the ABS plane, and a thickness t1. In some embodiments, write gap 16 behind the STO has thickness d1 that may be essentially equal to t1. Typically, h is a lesser distance from the ABS plane than edge 14x (at height a shown in FIG. 20) where the MP tapered trailing side 14t1 joins MP top surface 14t2.

Figure 19:
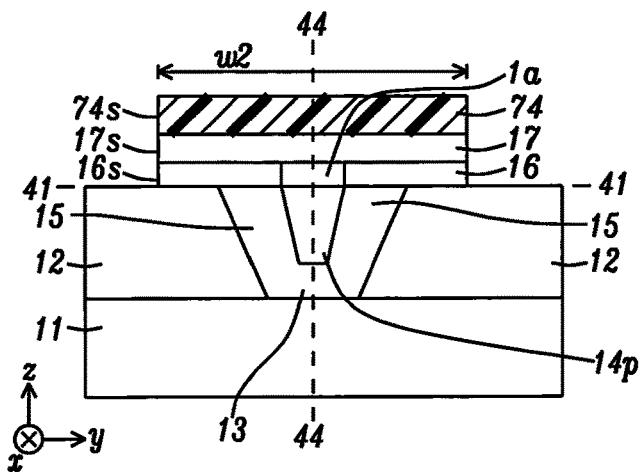
FIG. 19 is an ABS view of the writer in FIG. 18 after a first TS layer is deposited on the STO device and write gap, and the WG and first TS layer are patterned to form a cross-track width, and uncover portions of the side shield top surface.

Referring to FIG. 19, the first TS layer 17 is deposited on STO device 1a and on WG 16, and on side shield top surface 12t. Thereafter, a second photoresist layer is coated on first TS layer 17 and patterned to form photoresist mask 74 having sides 74s and a width w2 where w2>w. A second RIE or an ion beam etch (IBE) is employed to transfer the photoresist mask pattern through exposed portions of the first TS layer and WG, and stops on side shield top surface 12t at plane 41-41 thereby generating first TS layer side 17s and WG side 16s on each side of plane 44-44.

Figure 20:
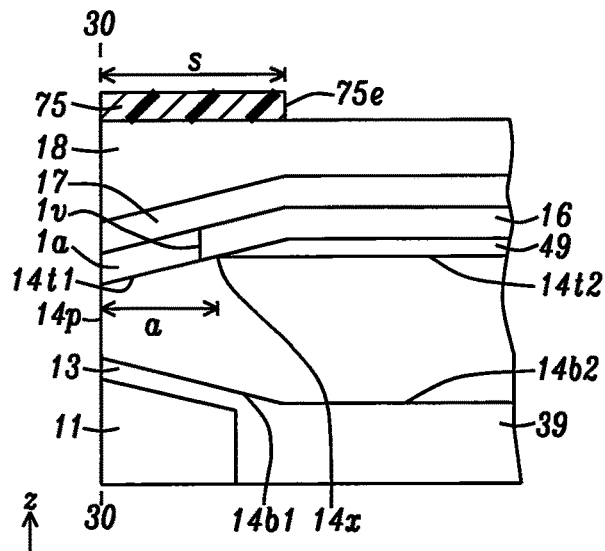
FIGS. 20-21 are down-track cross-sectional views depicting a patterning and etching process, respectively, to establish a backside on each of the first TS layer and the overlying second TS layer according to an embodiment described herein.

Referring to FIG. 20, photoresist mask 74 is removed. Then the second TS layer 18 is deposited on first TS layer 17 and on side shields 12. A third photoresist layer is coated and patterned on the second TS layer to provide photoresist mask 75 having a backside 75e at height s from the ABS plane 30-30 where s is generally larger than height a of MP edge 14x described earlier.

Figure 21:
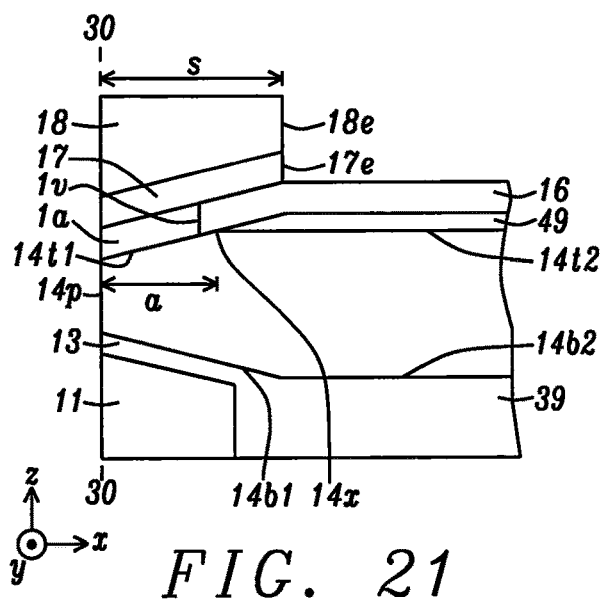

FIG. 21 depicts the partially formed writer structure in FIG. 20 after a third RIE or IBE step is performed to transfer the photoresist mask pattern through exposed regions of the first TS layer 17 and second TS layer 18, and stops at WG top surface 16t thereby forming first TS layer backside 17e and second TS layer backside 18e at height s from the ABS plane 30-30. Thereafter, a conventional process flow is followed to complete the writer structure. According to one embodiment, a combined read-write head 101 shown in FIG. 4 is formed.

While the present disclosure has been particularly shown and described with reference to, the preferred embodiments thereof, it will be understood by those skilled in the art that various changes in form and details may be made without departing from the spirit and scope of this disclosure.

We claim:

1. A spin transfer torque reversal assisted magnetic recording (STRAMR) structure, comprising:
   (a) a main pole (MP) that is configured to generate a write field which is directed through a pole tip at an air bearing surface (ABS), and to generate a write gap (WG) field in a down-track direction across a spin torque oscillator (STO) device in a WG, and between a MP trailing side and a trailing shield;
   (b) the trailing shield (TS) with a side at the ABS, and a bottom surface facing the MP; and
   (c) the STO device, comprising:
      (1) a flux guiding layer (FGL) with a magnetization pointing substantially parallel to the WG field and formed between a first spin polarization preserving layer (ppL1) and a second spin polarization preserving layer (ppL2);
      (2) a spin polarization (SP) layer that adjoins the TS bottom surface;
      (3) a non-spin polarization preserving layer (pxL) contacting the MP trailing side; and
      (4) a spin injection layer (SIL) between the pxL and ppL1 to give a pxL/SIL/ppL1/FGL/ppL2/SP layer configuration wherein one or both of the FGL and SIL has a spin polarization that is negative or positive but <0.3, and wherein the STO device is configured so that when a direct current (DC) of sufficient current density (J) is applied from the TS to MP across the STO device, the SIL and SP2 layer exert an additive spin torque on the FGL to cause the FGL magnetization to flip to a direction substantially antiparallel to the WG field thereby increasing reluctance in the WG and enhancing the write field.

2. The STRAMR structure of claim 1 wherein the SIL has a saturation magnetization×thickness (Mst) product substantially less than that of the FGL.

3. The STRAMR structure of claim 1 wherein the pxL is an alloy or multilayer made of one or more of Cr, Ir, NiCr, Ta, W, Pt, Pd, Rh, and Ti such that a net spin polarization in electrons transiting the pxL is effectively lost.

4. The STRAMR structure of claim 1 wherein the ppL1 and ppL2 are one or more of Cu, Au, Ag, Ru, Al, Cr, V, or alloys thereof, and having sufficient spin diffusion length to allow spin polarization in essentially an unaltered orientation for electrons traversing through ppL1 and ppL2.

5. The STRAMR structure of claim 1 wherein one or both of the SIL and FGL are a negative spin polarization material with a spin polarization from −0.4 to 0, and are made of an alloy that is of one or more of Fe, Co, and Ni with Cr, V, and Mn, or a multilayer thereof.

6. The STRAMR structure of claim 1 wherein one or both of the SIL and FGL with a spin polarization that is negative, or positive but less than 0.3 comprises a dopant that is one or more of B, C, and N.

7. The STRAMR structure of claim 1 wherein the SP layer has a magnetization ferromagnetically coupled to the TS, and substantially aligned in the WG field direction with or without the application of the DC across the STO device.

8. The STRAMR structure of claim 1 wherein each of the SP layer, FGL, and SIL have a saturation magnetization (Ms) from 6 kiloGauss (kG) to 15 kG, and a thickness from 1 to 4 nm.

9. A head gimbal assembly (HGA), comprising:
(a) the STRAMR structure of claim 1; and
(b) a suspension that elastically supports the STRAMR structure, wherein the suspension has a flexure to which the STRAMR structure is joined, a load beam with one end connected to the flexure, and a base plate connected to the other end of the load beam.

10. A magnetic recording apparatus, comprising:
(a) the HGA of claim 9;
(b) a magnetic recording medium positioned opposite to a slider on which the STRAMR structure is formed;
(c) a spindle motor that rotates and drives the magnetic recording medium; and
(d) a device that supports the slider, and that positions the slider relative to the magnetic recording medium.

11. A spin transfer torque reversal assisted magnetic recording (STRAMR) structure, comprising:
(a) a main pole (MP) that is configured to generate a write field which is directed through a pole tip at an air bearing surface (ABS), and to generate a write gap (WG) field in a down-track direction across a spin torque oscillator (STO) device in a WG, and between a MP trailing side and a trailing shield;
(b) the trailing shield (TS) with a side at the ABS, and a bottom surface facing the MP; and
(c) the STO device, comprising:
(1) a flux guiding layer (FGL) with a magnetization substantially parallel to the WG field, and formed between a first spin polarization preserving layer (ppL1) and a second spin polarization preserving layer (ppL2);
(2) a spin polarization (SP) layer that adjoins the MP trailing side;
(3) a non-spin polarization preserving layer (pxL) contacting the TS; and
(4) a spin injection layer (SIL) between the pxL and ppL1 to give a SP layer/ppL2/FGL/ppL1/SIL/pxL configuration wherein one or both of the FGL and SIL has spin polarization that is negative, or positive but less than 0.3, and wherein the STO device is configured so that when a direct current (DC) of sufficient current density (J) is applied from the MP to TS across the STO device, the SIL and SP2 layer exert an additive spin torque on the FGL to cause the FGL magnetization to flip to a direction substantially antiparallel to the WG field thereby increasing reluctance in the WG and enhancing the write field.

12. The STRAMR structure of claim 11 wherein the SIL has a saturation magnetization×thickness (Mst) product substantially less than that of the FGL.

13. The STRAMR structure of claim 11 wherein the pxL is an alloy or multilayer made of one or more of Cr, Ir, NiCr, Ta, W, Pt, Pd, Rh, and Ti such that a net spin polarization in electrons transiting the pxL is effectively lost.

14. The STRAMR structure of claim 11 wherein the ppL1 and ppL2 are one or more of Cu, Au, Ag, Ru, Al, Cr, and V, or alloys thereof, and having sufficient spin diffusion length to allow spin polarization in essentially an unaltered orientation for electrons traversing through ppL1 and ppL2.

15. The STRAMR structure of claim 11 wherein one or both of the SIL and FGL are a negative spin polarization material with a spin polarization from −0.4 to 0, and are made of an alloy that is of one or more of Fe, Co, and Ni with Cr, V, and Mn, or a multilayer thereof.

16. The STRAMR structure of claim 11 wherein one or both of the SIL and FGL with a spin polarization that is negative, or positive but less than 0.3 comprises a dopant that is one or more of B, C, and N.

17. The STRAMR structure of claim 11 wherein the SP layer has a magnetization ferromagnetically coupled to the MP, and substantially aligned in the WG field direction with or without the application of the DC across the STO device.

18. The STRAMR structure of claim 11 wherein each of the SP layer, FGL, and SIL have a saturation magnetization (Ms) from 6 kG to 15 kG, and a thickness from 1 to 4 nm.

19. A head gimbal assembly (HGA), comprising:
(a) the STRAMR structure of claim 11; and
(b) a suspension that elastically supports the STRAMR structure, wherein the suspension has a flexure to which the STRAMR structure is joined, a load beam with one end connected to the flexure, and a base plate connected to the other end of the load beam.

20. A magnetic recording apparatus, comprising:
(a) the HGA of claim 19;
(b) a magnetic recording medium positioned opposite to a slider on which the STRAMR structure is formed;
(c) a spindle motor that rotates and drives the magnetic recording medium; and
(d) a device that supports the slider, and that positions the slider relative to the magnetic recording medium.

21. A method of forming a spin transfer torque (STT) assisted magnetic recording structure, comprising:
(a) providing a main pole (MP) with a tapered trailing side that extends from an air bearing surface (ABS) plane to a first height (a) where the MP tapered trailing side connects with a MP top surface aligned orthogonal to the ABS plane and having a first dielectric layer formed thereon, and wherein the MP is separated from a side shield on each side of a center plane by a side gap;

(b) depositing a STO stack of layers on a top surface of the MP tapered trailing side, first dielectric layer, side gaps, and side shields; the STO stack of layers is bisected by the center plane and comprises:
   (1) a field generation layer (FGL);
   (2) first and second spin polarization preserving layers ppL1 and ppL2, respectively, that adjoin a bottom surface and top surface of the FGL;
   (3) a first spin polarization (SP) layer;
   (4) a non-spin polarization preserving layer (pxL); and
   (5) a spin injection layer (SIL) to give a SP layer/ppL2/FGL/ppL1/SIL/pxL configuration or a pxL/SIL/ppL1/FGL/ppL2/SP layer configuration;
(c) patterning the STO layer to form a STO device with two sides that are separated by a cross-track width (w), and a backside at a second height (h) where h<a, and depositing a write gap layer on exposed portions of the side gaps and side shields that are not covered by the patterned STO layer;
(d) depositing a first trailing shield (TS) layer on the patterned STO layer and the write gap layer; and
(e) patterning the first TS layer and write gap layer to form sides thereon, the first TS layer and write gap layer are bisected by the center plane and each have a width w2 where w2>w, and wherein at least one of the SIL and FGL has a spin polarization that is negative, or positive but less than 0.3.

22. The method of claim 21 further comprised of depositing a second TS layer on the first TS layer and on exposed portions of the side shields, wherein the SP layer magnetization is ferromagnetically coupled to that of the first TS layer or MP that is proximate to an interface with the SP layer.

23. The method of claim 21 wherein the SIL has a saturation magnetization×thickness (Mst) product substantially less than that of the FGL.

24. The method of claim 21 wherein the pxL is an alloy or multilayer made of one or more of Cr, Ir, NiCr, Ta, W, Pt, Pd, Rh, and Ti such that a net spin polarization in electrons transiting the pxL is effectively lost.

25. The method of claim 21 wherein the ppL1 and ppL2 are one or more of Cu, Au, Ag, Ru, Al, Cr, V, or alloys thereof, and having sufficient spin diffusion length to allow spin polarization in essentially an unaltered orientation for electrons traversing through ppL1 and ppL2.

26. The method of claim 21 wherein the one or both of the SIL and FGL with a spin polarization that is negative or positive but less than 0.3 is made of an alloy of one or more of Fe, Co, and Ni with Cr, V, and Mn, or a multilayer thereof.

27. The method of claim 21 wherein the one or both of the SIL and FGL with a spin polarization that is negative, or positive but less than 0.3 is comprised of one or more of B, C, or N.

* * * * *